(12) United States Patent
Krishnamurthy et al.

(10) Patent No.: US 10,697,757 B2
(45) Date of Patent: Jun. 30, 2020

(54) CONTAINER AUTO-DIMENSIONING

(71) Applicant: SYMBOL TECHNOLOGIES, LLC, Lincolnshire, IL (US)

(72) Inventors: Adithya H. Krishnamurthy, Hicksville, NY (US); Justin F. Barish, Kings Park, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 53 days.

(21) Appl. No.: 15/852,962

(22) Filed: Dec. 22, 2017

(65) Prior Publication Data
US 2019/0195617 A1      Jun. 27, 2019

(51) Int. Cl.
*G01B 11/02* (2006.01)
*G01B 11/22* (2006.01)
(Continued)

(52) U.S. Cl.
CPC .......... *G01B 11/022* (2013.01); *G01B 11/002* (2013.01); *G01B 11/22* (2013.01);
(Continued)

(58) Field of Classification Search
CPC .............. G01J 3/0272; G01J 2003/466; H04N 17/045; H04N 5/23238; H04N 7/181;
(Continued)

(56) References Cited

U.S. PATENT DOCUMENTS 5,850,352 A * 12/1998 Moezzi ................ H04N 13/139 345/419

5,880,742 A * 3/1999 Rao .......................... G06F 40/18 345/440

(Continued)

FOREIGN PATENT DOCUMENTS

WO      2016/032600 A1      3/2016

OTHER PUBLICATIONS

Invitation to Pay Additional Fees and, Where Applicable, Protest Fee for International Application No. PCT/US2018/061202 dated Apr. 8, 2019.
Xu et al.: "Guided filtering based pyramidal stereo matching for unrectified images", 2015 International Conference on Image and Vision Computing New Zealand (IVCNZ), IEEE, pp. 1-6 (Nov. 23, 2015). [retrieved on Nov. 28, 2016].
(Continued)

*Primary Examiner* — Aklilu K Woldemariam
(74) *Attorney, Agent, or Firm* — Yuri Astvatsaturov

(57) ABSTRACT

Embodiments of the present invention generally relate to the field of space dimensioning. In an embodiment, the present invention is a method of dimensioning a container bound by at least a first wall and a second wall opposite the first wall, the space being 3D and definable via height, width, and depth coordinates. The method includes: obtaining, a 3D image of at least a portion of the space; analyzing the image to determine a first and second equations defining first plane and second planes corresponding to the first and second walls; solving the first equation for a first coordinate value; solving the second equation for a second coordinate value, the first coordinate value and the second coordinate value being one of a width coordinate or a height coordinate; and computing a first distance based at least in part on the first coordinate value and the second coordinate value.

17 Claims, 10 Drawing Sheets

(51) Int. Cl.
*G01B 11/00* (2006.01)
*G06T 7/62* (2017.01)

(52) U.S. Cl.
CPC ...... *G06T 7/62* (2017.01); *G06T 2207/10012* (2013.01); *G06T 2207/10028* (2013.01); *G06T 2207/30268* (2013.01)

(58) Field of Classification Search
CPC .. G06T 7/80; G06T 7/55; G06T 7/593; G06T 2207/10012; G06T 2207/20081; G06T 7/194; G06T 7/50; G09G 2320/0285; G06K 9/6256; G06K 9/6269; G06K 9/6271; G06K 9/00201; G06K 9/00664; G06K 9/52; G06K 2209/03; G06K 9/00208; G06K 9/4609; G06K 9/6215; G11C 11/56; G05B 19/128; G05B 2219/31322; G05B 2219/45048; G05B 2219/40053; B65D 21/062; B65D 21/066; B60R 21/01542; B60R 21/01552; E05Y 2900/516; B60N 2/002; G01S 17/026; B60J 10/00; G06F 3/1242; G06F 3/0484; G06F 3/1211; G06F 16/532; G06F 16/5862; G06F 16/50; G06F 21/00; G06F 3/14; G06Q 30/0621; G06Q 30/0629; G08B 13/19647; B25J 9/163; B65G 47/46; G02B 2027/014; G02B 27/017; H04W 4/029
USPC .................. 382/118, 154; 715/738, 212, 220
See application file for complete search history.

(56) References Cited

U.S. PATENT DOCUMENTS

| | | | | |
|---|---|---|---|---|
| 6,006,240 | A * | 12/1999 | Handley | G06K 9/00449 715/220 |
| 6,957,775 | B2 * | 10/2005 | Tsikos | G06K 7/10722 235/462.01 |
| 9,102,055 | B1 * | 8/2015 | Konolige | B25J 9/163 |
| 2003/0052169 | A1 * | 3/2003 | Tsikos | G06K 9/26 235/454 |
| 2004/0125103 | A1 * | 7/2004 | Kaufman | G06T 15/06 345/419 |
| 2005/0172226 | A1 * | 8/2005 | Kobashi | G06F 40/103 715/246 |
| 2006/0147588 | A1 * | 7/2006 | Garwood | A23B 4/16 426/392 |
| 2010/0002834 | A1 * | 1/2010 | Gudmundson | G01N 23/04 378/53 |
| 2013/0033381 | A1 * | 2/2013 | Breed | B60T 1/005 340/568.1 |
| 2013/0342653 | A1 | 12/2013 | McCloskey et al. | |
| 2014/0193047 | A1 * | 7/2014 | Grosz | G06Q 30/0241 382/118 |
| 2014/0195921 | A1 * | 7/2014 | Grosz | G06F 3/1242 715/738 |
| 2016/0350592 | A1 * | 12/2016 | Ma | G06K 9/4671 |

OTHER PUBLICATIONS

Anonymous: "Mathematics and Statistics", Yale-NUS College, pp. 1-6 (Dec. 29, 2016). https://math.stackexchange.com/questions/554380/how-to-find-the-distance-between-two-planes [retrieved on Mar. 13, 2019].

* cited by examiner

US 10,697,757 B2

CONTAINER AUTO-DIMENSIONING

BACKGROUND

Goods can be transported in many different ways using many different methods. Long-haul transportation in particular often employs containers which can be loaded with goods and thereafter moved by vehicles, trains, marine vessels, or airplanes to their desired destinations. While not always relying on detachable containers, short-haul goods transport similarly uses vehicles like delivery trucks/box trucks which have attached containers for storage of items and freight.

In the past, most loading or unloading of goods was performed without significant input from computerized systems. However, with the evolution of computing capabilities, the availability of sensed environmental data, and the ever-increasing focus on efficiency, today's loading and unloading procedures are monitored, supervised, and/or assisted by computing platforms that can act on information in an instance. One of the parameters that can be advantageously used by such computing platforms is the dimension of a container. Recognizing the dimension of a container can assist in, for example, monitoring the fullness, preventing the loading of oversized freight, preventing oversized loading equipment from being introduced into the container, more accurately planning the load and/or unload process, and so on.

Seeing as how container dimensions vary not only across different types of containers (e.g., trailers designed to be hitched and towed by semi-trucks and delivery trucks) but among the same types of containers (e.g., different sized delivery trucks, different sized trailers, and so on), there exists a need for improved, automated means of detecting and reporting dimensions of a container. Additionally, there is a need to optimize such means to perform efficiently.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
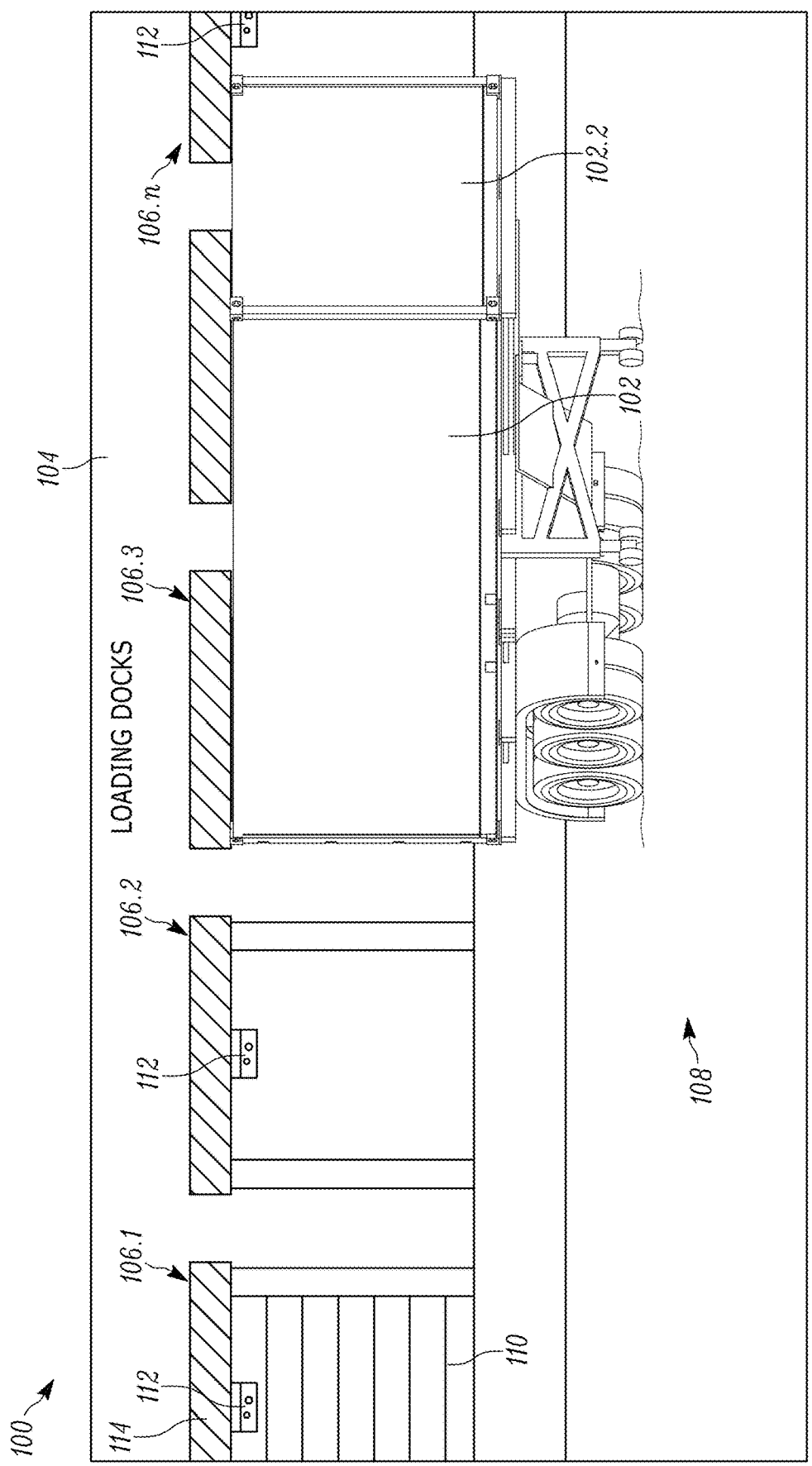
FIG. 1 illustrates a loading facility in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As used herein, the term "container" shall refer to any container transportable by at least one of a vehicle, a train, a marine vessel, and airplane, and configured to store transportable goods such as boxed and/or unboxed items and/or other types of freight. Accordingly, example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above.

In an embodiment, the present invention is a method of dimensioning a space (e.g., a container) bound by at least a first wall and a second wall opposite the first wall, the space being three-dimensional and definable via height, width, and depth coordinates. The method includes: obtaining, by an image capture apparatus, a three-dimensional image of at least a portion of the space; analyzing the three-dimensional image to determine a first equation defining a first plane corresponding to the first wall and to determine a second equation defining a second plane corresponding to the second wall; solving the first equation for a first coordinate value; solving the second equation for a second coordinate value, the first coordinate value and the second coordinate value being one of a width coordinate or a height coordinate; and computing a first distance based at least in part on the first coordinate value and the second coordinate value.

In another embodiment, the present invention is a method of dimensioning a height of a space (e.g., a container) bound by at least a floor, a first upright wall, and a second upright wall, the space being three-dimensional and definable via height, width, and depth coordinates. The method includes: obtaining a three-dimensional image of at least a portion of the space, the three-dimensional image including three-dimensional point data; analyzing the three-dimensional image to determine a first equation defining a first plane corresponding to the floor; solving the first equation for a first height coordinate value; determining a second height coordinate value that is selected from within a first plurality of greatest height coordinate values associated with the first upright wall; determining a third height coordinate value that is selected from within a second plurality of greatest height coordinate values associated with the second upright wall; and computing a first distance based at least in part on the first height coordinate value and a lower one of the second height coordinate value and the third height coordinate value.

In still another embodiment, the present invention is a method of dimensioning a depth of a space (e.g., a container) bound by at least a floor, a first upright wall, a second upright wall opposite and parallel the first upright wall, and a third upright wall normal to the first upright wall and the second upright wall, the space being three-dimensional and definable via height, width, and depth coordinates. The method includes: obtaining a three-dimensional image of at least a portion of the space, the three-dimensional image including points with three-dimensional point data; obtaining a two-dimensional image of the at least the portion of the space, the two-dimensional image including pixels with pixel data, at least some of the points corresponding to some of the pixels; and conducting dimensional analysis on a filtered portion of the two-dimensional image, the filtered portion including at least some of the pixels that do not correspond the at least some of the points.

Referring now to the drawings, FIG. 1 illustrates an exemplary environment where embodiments of the present invention may be implemented. In the present example, the environment is provided in a form of a loading dock 100 (also referred to as a loading facility) where containers 102 are loaded with various goods and/or where various goods are unloaded from the containers 102. The loading dock 100 is comprised of a facility 104 having a plurality of loading bays 106.1-106.n facing a loading facility lot 108 where vehicles, such as semis (not shown), deliver and pick up containers 102. To be loaded, each container 102 is backed toward the facility 104 such that it is generally perpendicular with the wall having the loading bays 106, and in line with one of the loading bays (in this case 106.3). As illustrated, each loading bay 106 includes a bay door 110 that can be lowered to close the respective loading bay 106 or raised to open the respective loading bay allowing the interior of the facility 104 to be accessible therethrough. Additionally, each loading bay 106 is provided with a container monitoring unit (CMU) 112. The CMU is mounted near the container loading area, preferably in the upper section of the loading bay 106 outside the door 110 facing the loading facility lot 108 or an interior/rear of a container 102 if one is docked at the respective loading bay. To protect the CMU from inclement weather, it could be mounted under a bay awning 114. Once docked, goods can be loaded onto/unloaded from the container 102 with the CMU 112 maintaining a view of the rear/inside of the container.

Figure 2:
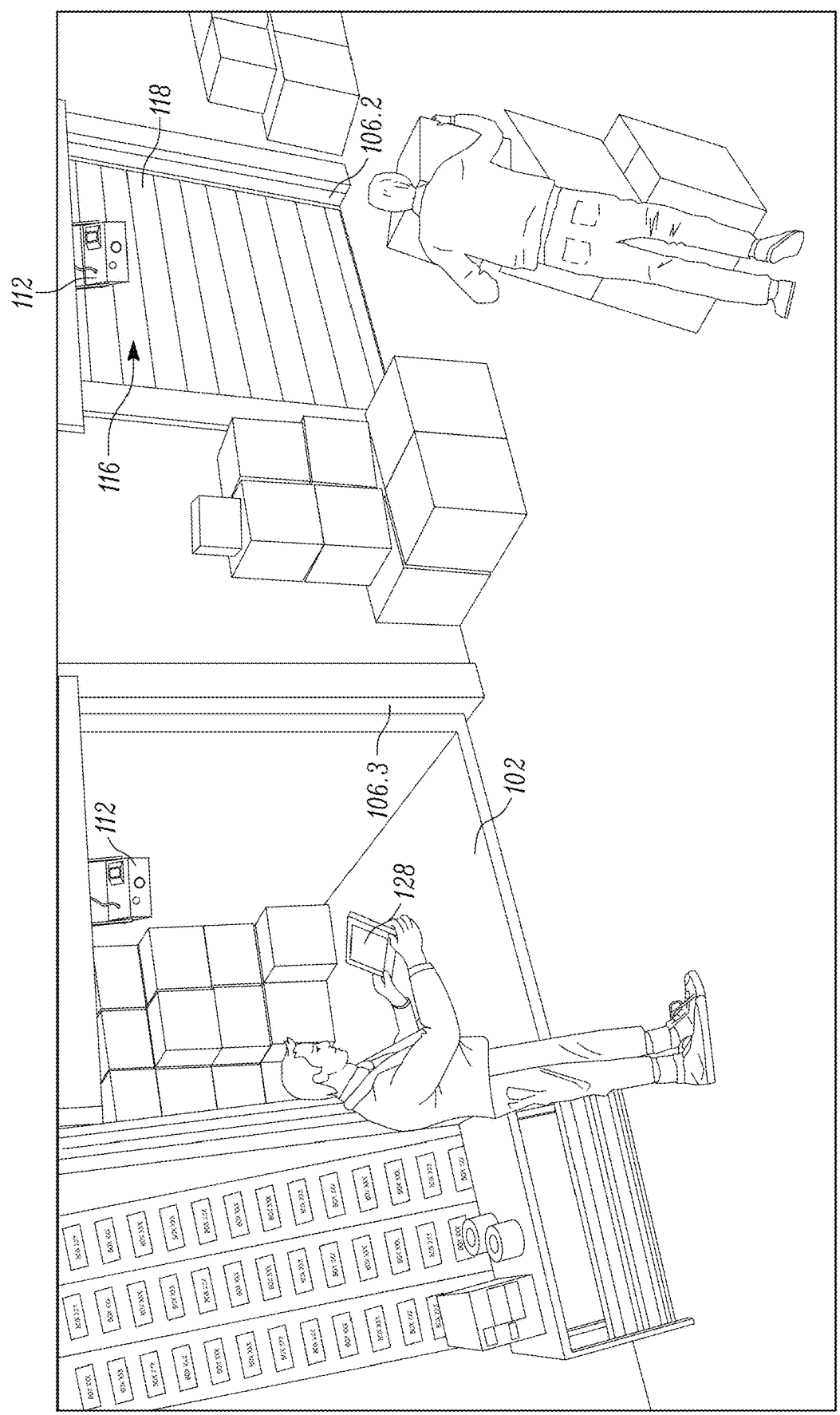
FIG. 2 illustrates an interior of the loading facility of FIG. 1.

FIG. 2 is an exemplary perspective view of the loading facility 104 of FIG. 1, as seen from the inside, depicting container 102 docked at a loading bay 106.3 with an open container door and container 116 docked at a loading bay 163.2 with a closed container 118. To help determine the status of the container door, the CMU 112 is employed, as described further below.

Figure 3:
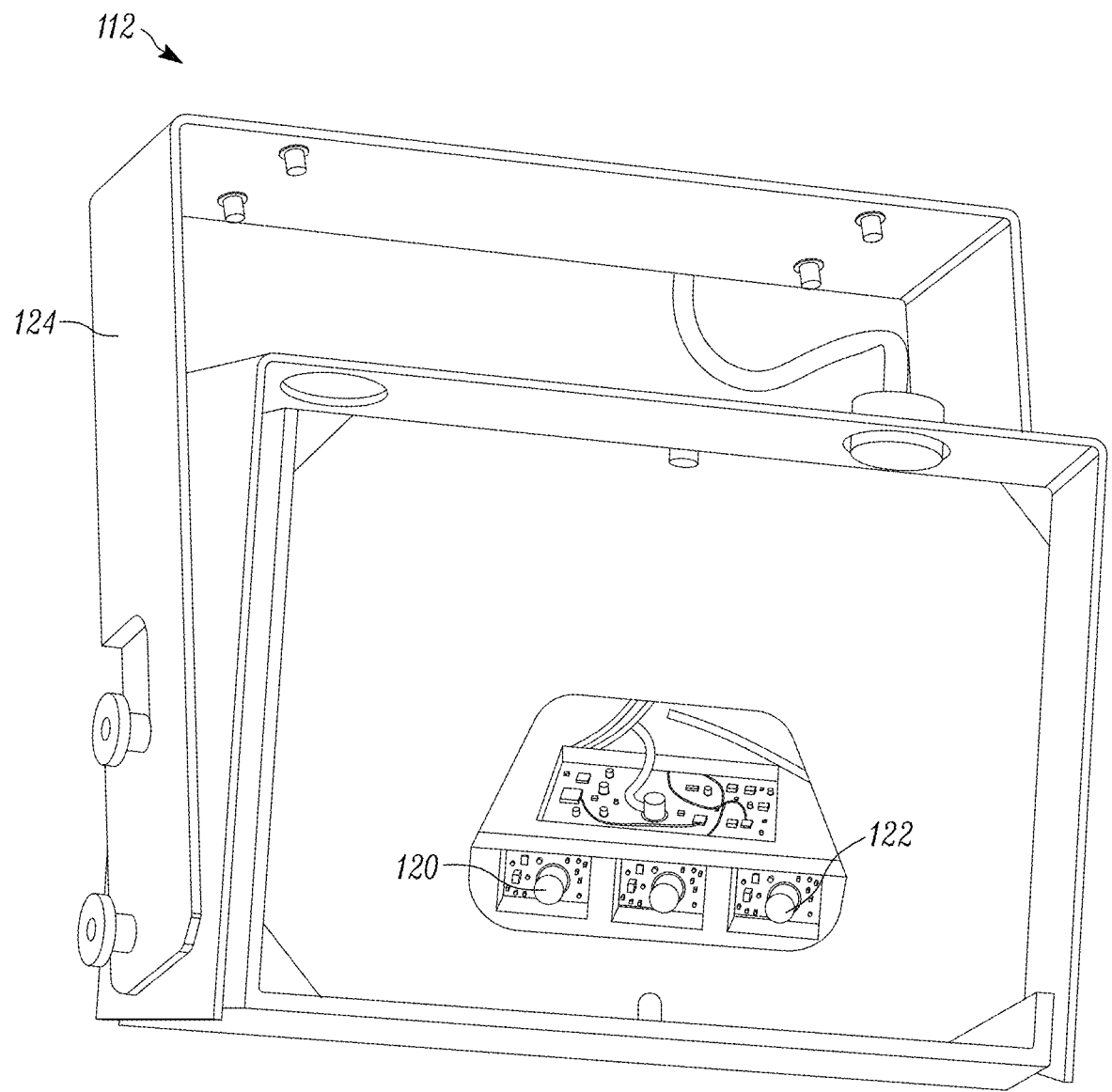
FIG. 3 illustrates a trailer monitoring unit in accordance with an embodiment of the present invention.

In the currently described embodiment and as shown in FIG. 3, the CMU 112 is a mountable device that includes a 3D-depth camera 120 for capturing 3D (three dimensional) images (e.g., 3D image data comprised of a plurality of points with three-dimensional point data) and a 2D camera 122 for capturing 2D images (e.g., 2D image data). The 2D camera may be an RGB (red, green, blue) camera for capturing 2D images. The CMU 112 also includes one or more processors and one or more computer memories for storing image data, and/or for executing application/instructions that perform analytics or other functions as described herein. For example, the CMU 112 may include flash memory used for determining, storing, or otherwise processing the imaging data and/or post-scanning data. In addition, CMU 112 may further include a network interface to enable communication with other devices (such as server 130). The network interface of CMU 112 may include any suitable type of communication interface(s) (e.g., wired and/or wireless interfaces) configured to operate in accordance with any suitable protocol(s). In various embodiments, and as shown in FIGS. 1 and 2, the CMU 112 is mounted via a mounting bracket 124 and oriented in the direction of docked containers to capture 3D and/or 2D image data of the interior and exterior thereof.

In an embodiment, to capture 3D image data, the 3D depth camera 120 includes an Infra-Red (IR) projector and a related IR camera. The IR projector projects a pattern of IR light or beams onto an object or surface, which may include surfaces of the container 102 (like the door, walls, floor, etc.), objects within the interior of the container (like boxes, packages, temporary shipping equipment, etc.), and/or surfaces of the loading facility lot 108 (like the surface of the loading facility lot on which the containers are parked). The IR light or beams may be distributed on the object or surface in a pattern of dots or points by the IR projector, which may be sensed or scanned by the IR camera. A depth-detection application, such as a depth-detection application executing on the one or more processors or memories of CMU 112, can determine, based on the pattern of dots or points, various depth values, for example, depth values of the interior of the container 102. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection application and/or CMU 112 to generate a depth map. The depth map may represent a 3D image of, or contain 3D image data of, the objects or surfaces that were sensed or scanned by the 3D-depth camera 120.

Additionally, in an embodiment, to capture 2D image data, the 2D camera 122 includes an RGB (red, green, blue) based camera for capturing 2D images having RGB-based pixel data. In some embodiments, the 2D camera 122 captures 2D images, and related 2D image data, at the same or similar point in time as the 3D-depth camera 120 such that the CMU 112 can have both sets of 3D image data and 2D image data available for a particular surface, object, or scene at the same or similar instance in time.

Figure 4A:
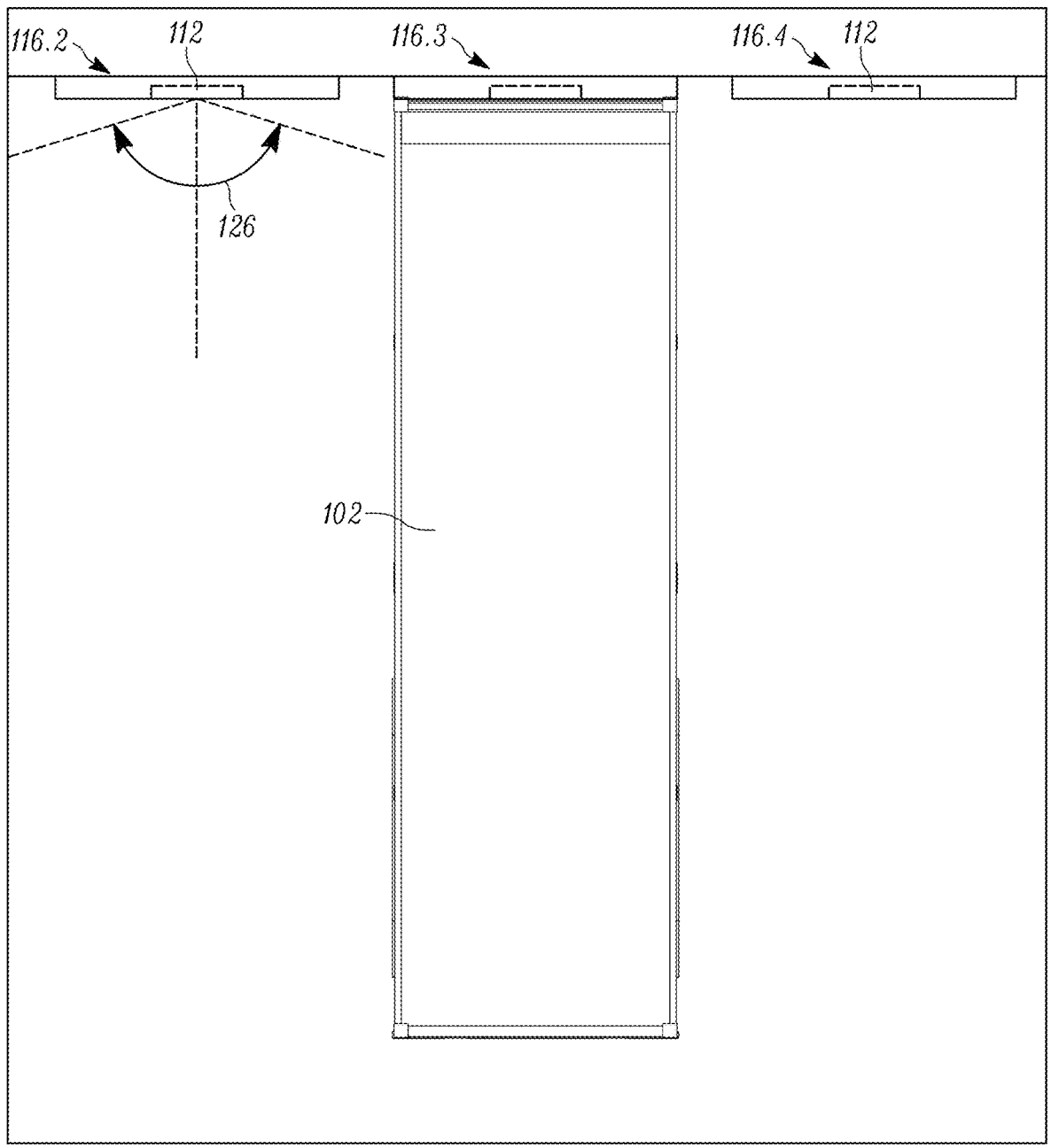
FIG. 4A illustrates a top-down view of the loading facility of FIG. 1 showing an exemplary field of view of a trailer monitoring unit.
Figure 4B:
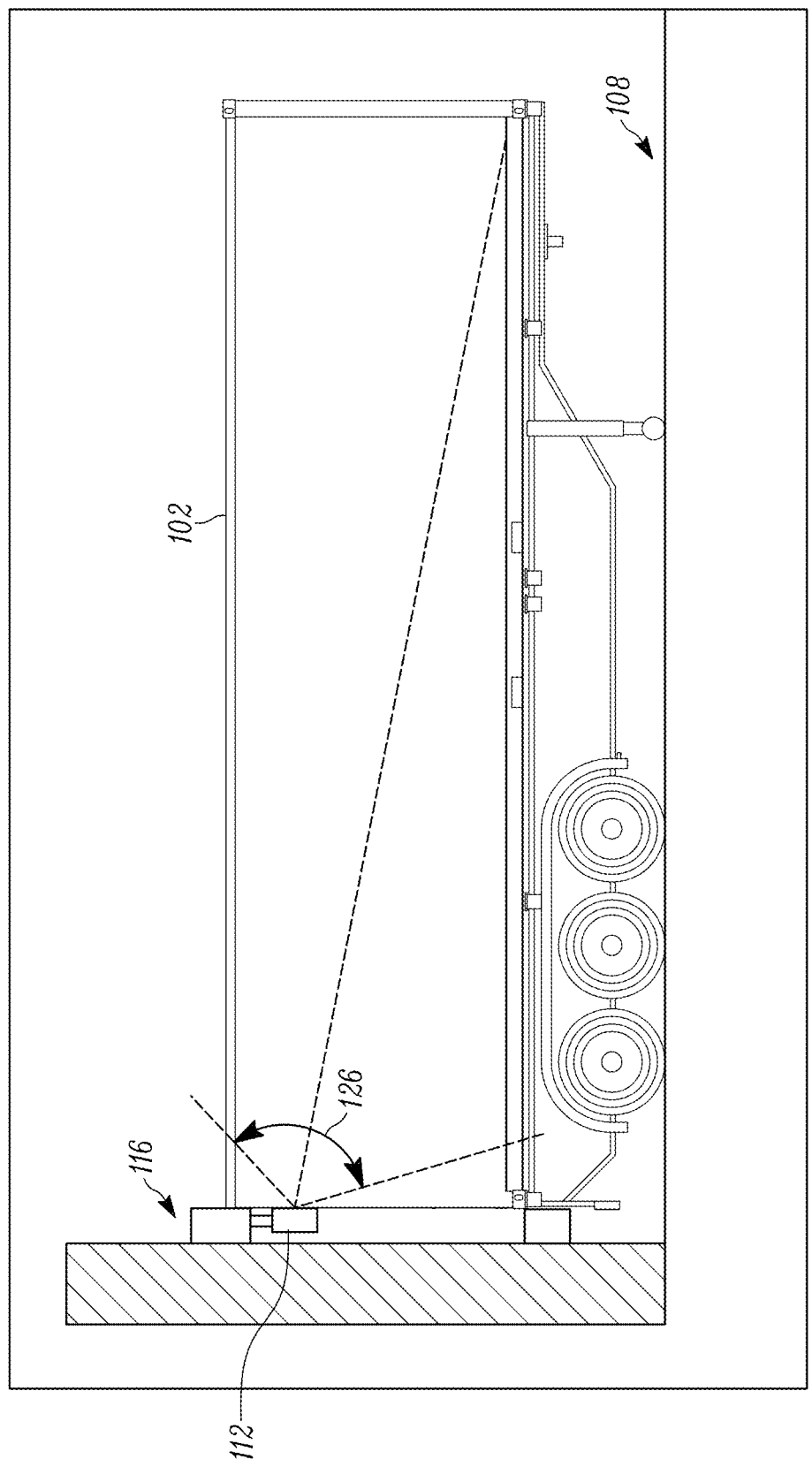
FIG. 4B illustrates a side view of the loading facility of FIG. 1 showing an exemplary field of view of a trailer monitoring unit.

Referring to FIGS. 4A and 4B, the CMU can be oriented such that its fields of view (FsOV) 126 for the 3D camera and the 2D camera expand to capture a majority of the interior of the container. Additionally, both FsOV can substantially overlap to capture data over substantially the same area. As a result, the CMU 112 can scan, sense, or otherwise capture image data from the walls, floor, ceiling, packages, or other objects or surfaces within the container to determine the 3D and 2D image data. Similarly, when a container is absent from the loading bay, the CMU can scan, sense, or otherwise capture image data from the loading facility lot 108 surface to determine the 3D and 2D image data. The image data may be processed by the one or more processors and/or memories of the CMU 112 (or, in some embodiments, one or more remote processors and/or memories of a server) to implement analysis, functions, such as graphical or imaging analytics, as described by the one or more various flowcharts, block diagrams, methods, functions, or various embodiments herein.

Figure 5:
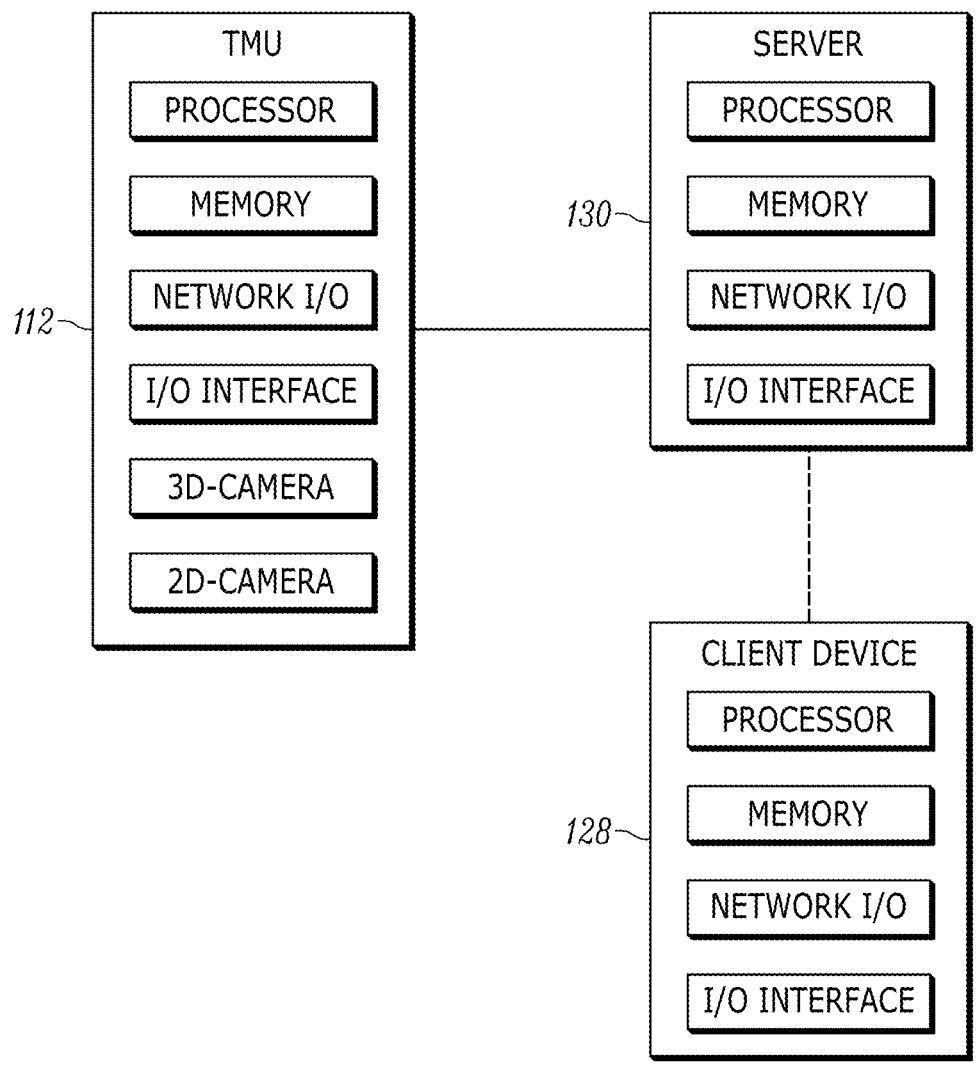
FIG. 5 illustrates an exemplary block diagram schematic of a communication network implemented in the facility of FIG. 1.

In some embodiments, the CMU 112 processes the 3D and 2D image data for use by other devices (e.g., client device 128 (which can be in a form of a mobile device, such as a tablet, smartphone, laptop, or other such mobile computing device), or server 130 (which can be in a form of a single or multiple computers operating to manage access to a centralized resource or service in a network)). The processing of the image data may generate post-scanning data that may include metadata, simplified data, normalized data, result data, status data, or alert data as determined from the original scanned or sensed image data. As shown in FIG. 5, which illustrates a block connection diagram between the CMU 112, server 130, and client device 128, these devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards.

In some embodiments, the server 130 may be located in the same loading facility 104. In other embodiments, server 130 may be located at a remote location, such as on a cloud-platform or other remote location. In still other embodiments, server 130 may be formed of a combination of local and cloud-based computers.

Server 130 is configured to execute computer instructions to perform operations associated with the systems and methods as described herein. The server 130 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used.

To assist with the dimensioning of containers, the aforementioned components may be used, alone or in combination, to detect and/or provide various measurements of the interior of the container docked at a loading bay.

Figure 6:
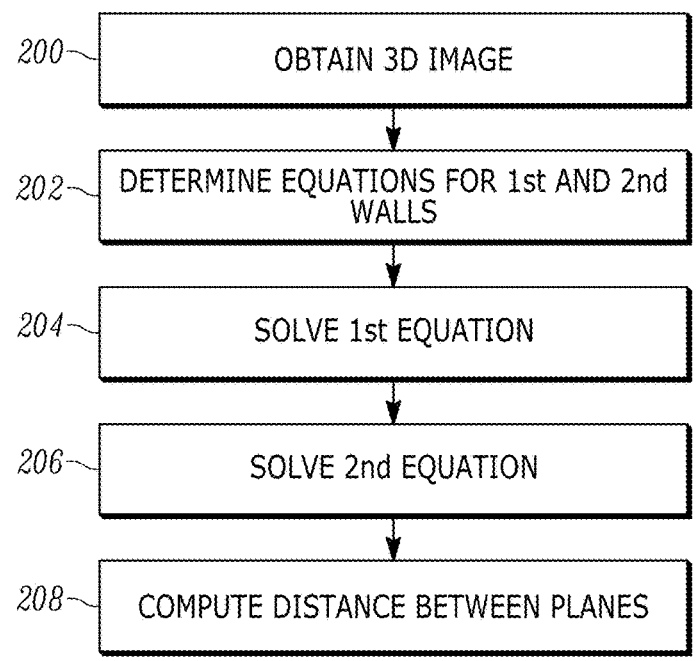
FIG. 6, illustrates a flowchart representative of a method of auto-dimensioning a trailer in accordance with an embodiment of the present invention.

Referring to FIG. 6, shown therein is a flowchart representative of a method of dimensioning a space bound by at least a first wall and a second wall opposite the first wall, the space being three-dimensional and definable via height, width, and depth coordinates. In step 200, the method includes the operation of obtaining, by an image capture apparatus, a three-dimensional image of at least a portion of the space. The image capture apparatus can be implemented via the CMU 112 that is configured to capture 3D images. In case of dimensioning an interior of a container at a loading facility, it is preferable to oriented the image capture apparatus such that its 3D FOV extend into the area of the loading facility lot, and more specifically, into the area where a container (such as trailer 102) is expected to be positioned during loading and unloading procedures. This configuration allows the image capture apparatus to sense (by capturing and analyzing 3D data) the presence or absence of various objects in the vicinity of its FOV, and make various determinations based thereon.

Figure 7A:
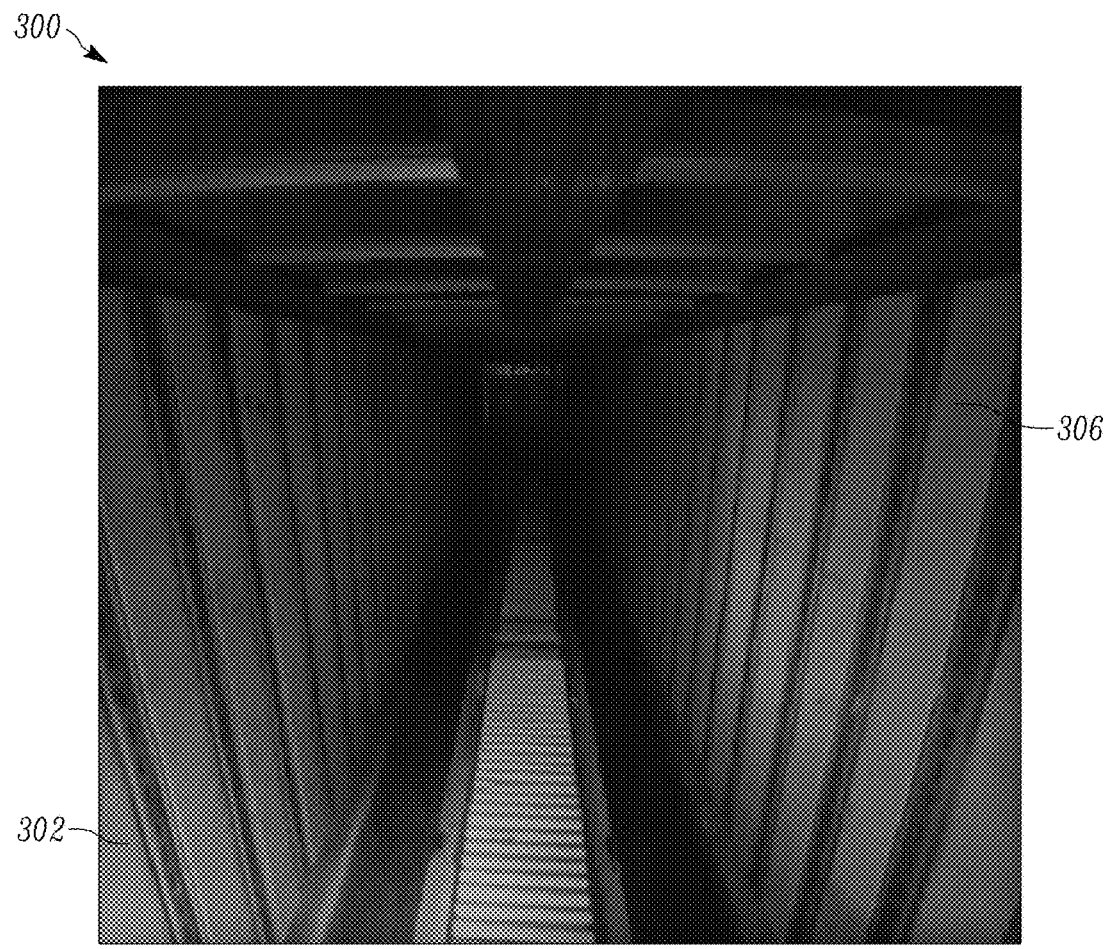
FIGS. 7A and 7B illustrate, respectively, 2D and 3D images of a container as captured by an image capture device in accordance with an embodiment of the present invention.
Figure 7B:
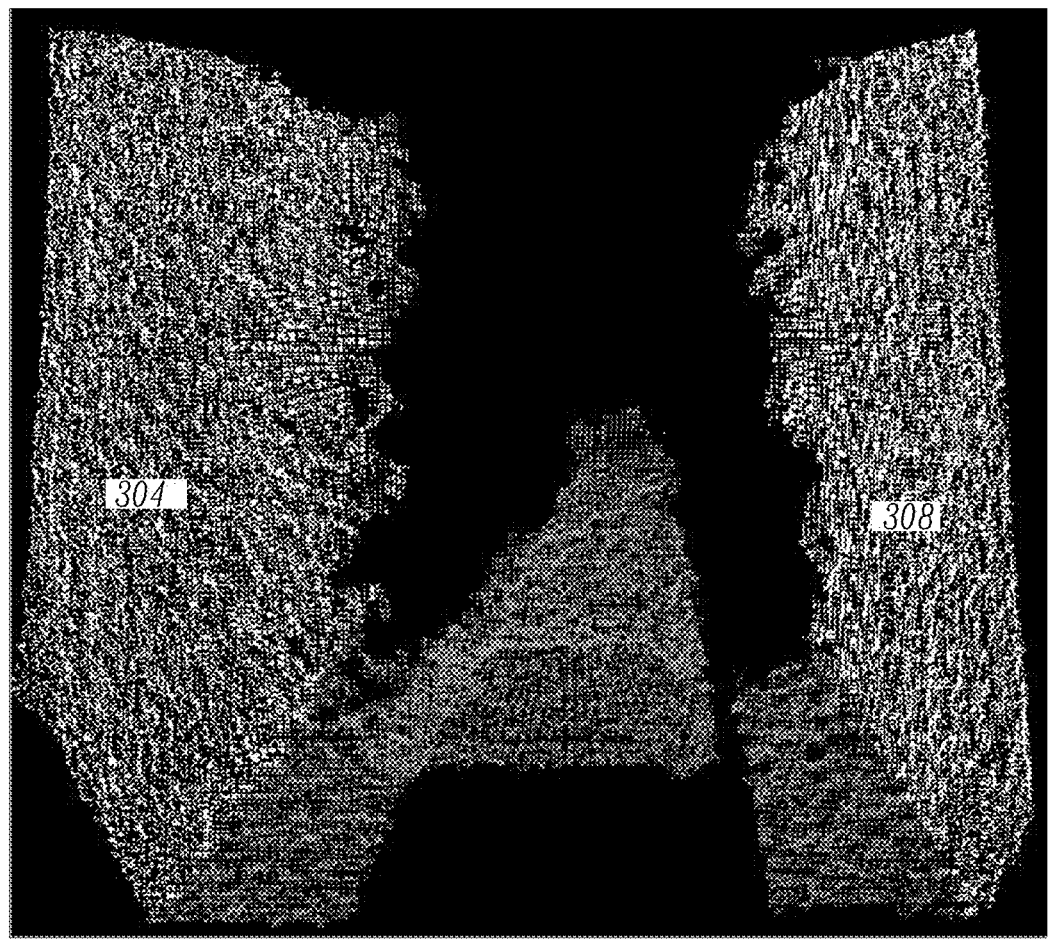

Next, in step 202 the method includes the operation of analyzing the three-dimensional image to determine a first equation defining a first plane corresponding to the first wall and to determine a second equation defining a second plane corresponding to the second wall. Referring to FIGS. 7A and 7B, which respectively illustrate 2D and 3D representations of an interior 300 of a loading container as captured by a CMU image capture apparatus, the plane of a first wall 302 is represented by the connection of points and the plane corresponding to a second wall 306 is represented by the collection of points 308.

Knowing that the analysis must focus on a detection of some plane (i.e., some substantially flat surface), one may rely on 3D imaging segmentation analysis. In some embodiments, sample consensus (SAC) segmentation analysis may be used to determine points in the 3D image data that correspond to different planes or surfaces. This can be applied to a wide variety of surfaces, including interior and exterior surfaces of the trailer (e.g., internal walls, floor, ceiling, and external surfaces like the exterior side of the door) and also surfaces of objects located within the trailer itself. SAC segmentation analysis determines, or segments, the different planes or surfaces of the environment into x, y, z coordinate planes by identifying a correlation of common points along x, y, z planes oriented within the 3D image data. As such, this method may be used to analyze a certain plurality of points within the 3D image and identify a presence of a plane corresponding to a substantially flat surface and to define that plane/substantially flat surface by an equation having the form of $Ax+By+Cz=D$. Additionally, one may also determine whether a variance of the respective depth values of the second sub-plurality of the plurality of points is within a predetermined depth-variance threshold, the variance being within the predetermined depth-variance threshold being an indicator that the three-dimensional formation is substantially flat. For FIGS. 7A and 7B, SAC segmentation analysis results in the first wall 302 being defined by a plane have the equation:

$$0.999536x+0.00416241y+0.0301683z=-1.15774 \quad (1)$$

and the second wall 306 being defined by a plane having the equation:

$$0.999762x-0.0210643y+0.00561335z=1.35227 \quad (2)$$

with both equations being generated for use with x, y, z coordinates measured in meters.

Upon obtaining the equations for planes that define the first and second walls, in step 204 the method includes the operation of solving the equation for a first coordinate value and in step 206 the method includes the operation of solving the equation for a second coordinate value where the first coordinate value and the second coordinate value are for the same type of a coordinate. Preferably, the first coordinate value and the second coordinate value are one of a width coordinate or a height coordinate. In the example, of FIGS. 7A and 7B, solving equations (1) and (2) for the width coordinate x involves selecting y and z values and plugging those values into equations (1) and (2) to solve for x. For instance, for equation (1), selecting $y=1$ and $z=1$ results in $x=-1.192624088$ meters. Using the same y and z values in equation (2) results in $x=1.368046545$ meters. It should be noted that in solving for a coordinate value, any values can be selected for the other two values (i.e., if solving for x, any values may be selected for y and z). However, in a preferred embodiment, values representative of coordinates that are close to the image capture device should be selected (e.g., within 3 meters from the image capture device along the z direction and within 3 meters from the image capture device along the y or x direction). This reduces the risk that distortion created by the optics within the image capture apparatus or perspective distortion will have a significant-enough effect on the calculations.

Upon having solved for the first and second coordinate values, in step 208 the method includes the operation of computing a first distance based at least in part on the first coordinate value and the second coordinate value. Referring to the examples of FIGS. 7A and 7B and equations (1) and (2) above, each of the computed first and second coordinate values will represent a point on the respective plane that is located at the same height and depth in 3D space. Thus, taking the absolute value of the difference between the first and second coordinate values (2.560670633 m) can serve to provide the desired calculation of a distance between the two planes at the given coordinates. In case of a trailer, as used in the example of FIGS. 7A and 7B, this distance can be used as an overall width dimension, as the trailer is comprised of two parallel and opposite side walls that remain the same distance apart the entire depth of the trailer.

The method of dimensioning of FIG. 5 can be especially advantageous when used in dimensioning interior areas of freight-carrying containers like trailers, shipping containers, delivery and box trucks, and so on. This is mainly due to the fact that such containers typically have a rectangularly constructed interior, allowing for a calculated dimension (height, width, and/or depth) to be applied equally through the entire container. Still, in some instances container interiors are irregular in that there are times when a portion of a wall will be displaced relative to a portion making up the remainder of that wall. This is sometimes seen with, for example, delivery trucks where the cargo area will not only abut the rear of the driver's cab but it will also extend partially over the top thereof. Skilled artisans will recognize, however, that principles of the currently disclosure are equally applicable to these cases as well, allowing for a dimensional mapping over a plurality of points.

Dimensional calculation over multiple points may also be used to more accurately calculate the desired distance between two planes. For instance, referring to equations (1) and (2), the equations can be solved for x any n number of times using n pairs of y, z coordinate values. Then, the results can be averaged in an effort to obtain a more accurate calculation. Additionally, it may be desirable to perform image distortion correction after the 3D image is captured by the image capture apparatus.

While the method of FIG. 6 may be successfully used in setting like, freight-carrying containers, to calculate both width and height, in some instances calculation of the height dimension may at least be difficult to obtain accurately. This can occur in instances where the image capture apparatus is mounted rather close to one of the walls (like the CMU being mounted close to the ceiling of the container) such that it is unable to effectively capture 3D data that allows for an accurate detection of a plane, disallowing an accurate computation of an equation that would define such a plane. In this case, a modified approach may be used to determine the height of the container. An example of such an approach is provided in FIG. 8 which illustrates a flowchart representative of a method for dimensioning a height of a space bound by at least a floor, a first upright wall, and a second upright wall, the space being three-dimensional and definable via height, width, and depth coordinates. It should be understood that the same hardware and/or analysis can be applied to the method of FIG. 8 as was applied to the method of FIG. 6 to obtain and/or calculate various data like image data and/or planar data.

Figure 8:
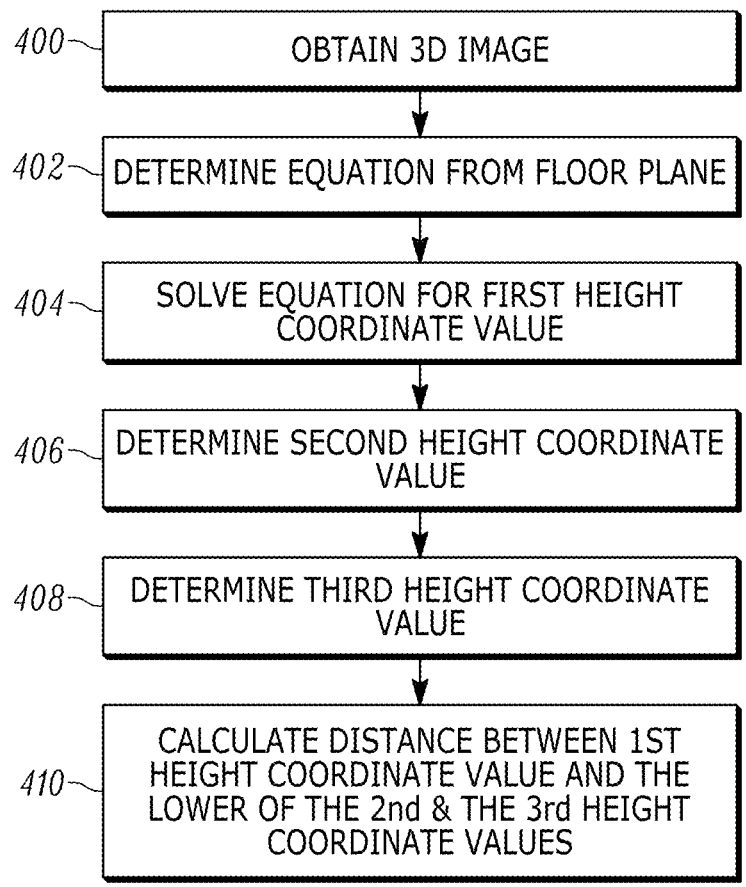
FIG. 8, illustrates a flowchart representative of a method of auto-dimensioning a trailer in accordance with an embodiment of the present invention.

The method of FIG. 8 begins with step 400 which includes obtaining, via for example an image capture device, a three-dimensional image of at least a portion of the space, the three-dimensional image including three-dimensional point data. Next, in step 402, the method includes analyzing the three-dimensional image to determine a first equation defining a first plane corresponding to the floor. The equation may be expressed as $Ax+By+Cz=D$. As described previously, SAC segmentation analysis may be used to obtain the appropriate equation. Next in step 404, the method includes the operation of solving the first equation for a first height coordinate value (e.g., solving for y in the event of using equation $Ax+By+Cz=D$ by selecting x and z values that corresponds to distances that are no more than 3 meters from the image capture device used to obtain the three-dimensional image along the respective axis). Next, in steps 406 and 408 the method includes the operations of determining a second and third height coordinate values that are respectively associated with the tops of the first and second upright walls. Since the determination of the coordinate values is driven by the three-dimensional point data in the 3D image and that data may include noise, it may not always be preferable to simply pick a point on a wall plane with the highest height coordinate value. Instead, upon detecting a particular plane that corresponds to a wall, filter(s) may be applied to the point set that represents the wall and the plane to remove points that could correspond to, for example noise. This can include, for instance, an edge detection filter that could more clearly define the top edge of the wall, allowing a selection of a highest height coordinate value within filtered point set to be representative of the heist point on the wall. Accordingly, the selected height coordinate value can be selected from within a plurality of greatest height coordinate values associated with the respective upright wall.

Finally, in step 410, the operation of computing a height distance can be carried out. Since in practice, there are instances where one sidewall of a container may be slightly lower than the other, or that due to distortion one side wall may appear to be slightly taller than the opposite side wall, the distance calculation of step 410 relies on the lower one of the second height coordinate value and the third height coordinate value. Thus, the final distance calculation can be performed by solving for an absolute value of the difference between the first height coordinate value and the lower one of the second height coordinate value and the third height coordinate value. This distance can be representative of the height of a space such as a freight-carrying container, especially where 3D data representative of the ceiling cannot be accurately captured or has been filtered out for various reasons.

While the methods of described above may be especially beneficial in dimension detection of height and width parameters of a space bound by opposite walls (including floor and ceiling) additional/separate methods may be necessary to determine the depth of a space such as a freight-carrying container. The need for this approach may be necessary by the fact that certain walls of a container may be out of depth detection range of a 3D image capture apparatus. For example, referring back to FIG. 1, the interior portion of the front wall 102.2 of container 102 may not be detectable by the CMU 112 if the length of the container exceeds the maximum depth detection range of the CMU. The exemplary method provided in FIG. 9 attempts to address this concern.

Figure 9:
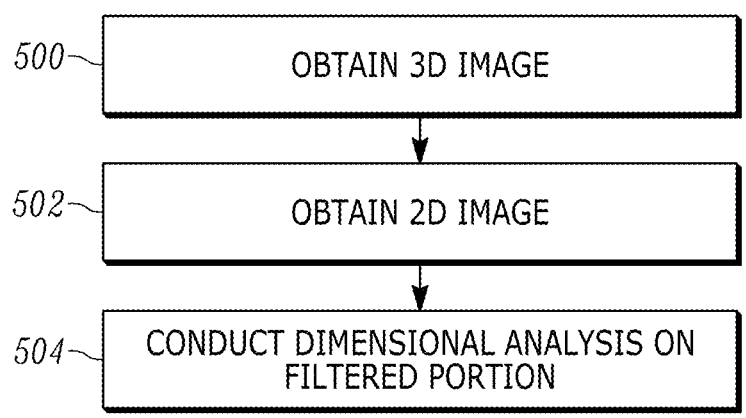
FIG. 9, illustrates a flowchart representative of a method of auto-dimensioning a trailer in accordance with an embodiment of the present invention.
Figure 10:
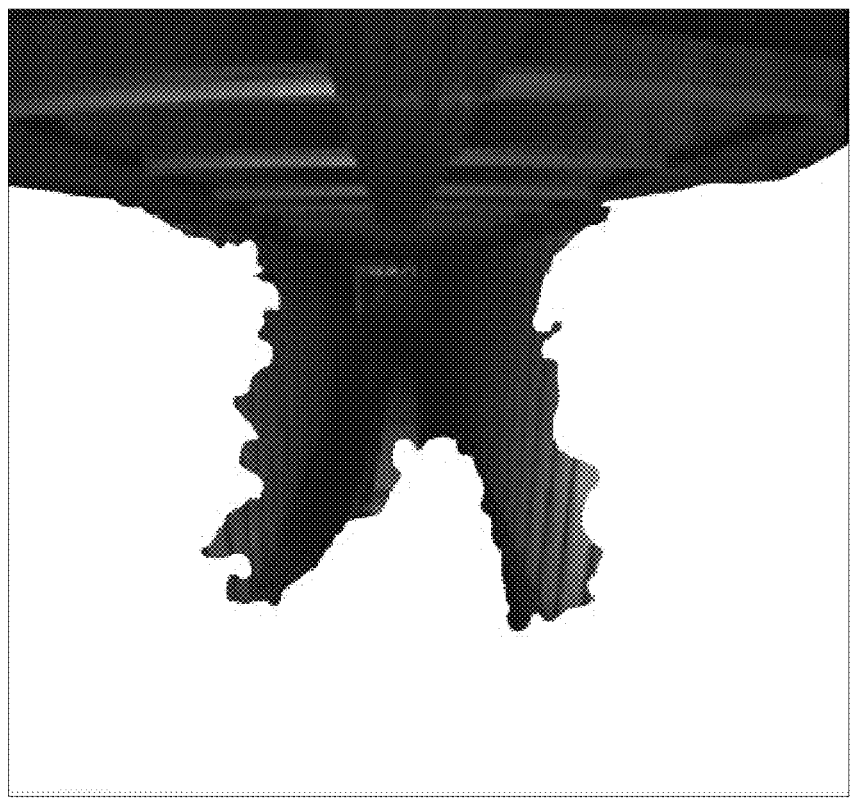
FIG. 10 is an example of a filtered image of the image of FIG. 7A.

In particular, FIG. 9 illustrates a flowchart representative of a method of dimensioning a depth of a space bound by at least a floor, a first upright wall, a second upright wall opposite and parallel the first upright wall, and a third upright wall normal to the first upright wall and the second upright wall, the space being three-dimensional and definable via height, width, and depth coordinates. As with prior methods, the same hardware and/or analysis can be applied to the method of FIG. 9. In step 500, the method includes the operation of obtaining a three-dimensional image of at least a portion of the space, the three-dimensional image including points with three-dimensional point data. Next in step 502, the method includes obtaining a two-dimensional image of the at least the portion of the space, the two-dimensional image including pixels with pixel data, at least some of the points corresponding to some of the pixels. Finally in step 504, the method includes the operation of conducting dimensional analysis on a filtered portion of the two-dimensional image, the filtered portion including at least some of the pixels that do not correspond the at least some of the points. Referring back to the example of FIGS. 7A and 7B, it can be seen that the 3D image data visually represented in FIG. 7B by the connection of points lacks points (and thus point data) that corresponds to the far end of the container. Thus, upon executing steps 500 and 502 to capture the images of FIGS. 7A and 7B, one may filter the 2D image by overlaying the three-dimensional image on the two-dimensional image and retaining 2D pixel data only for areas that lack 3D point data. The resulting of such a filtration is illustrated in FIG. 10. Once the filtered 2D image is obtained, further image analysis can be conducted thereon to determine the depth. For example, the filtered image may be compared against a plurality of preexisting images of containers each having a known depth. A match between the images will provide match to a known depth. In other examples, the filtered 2D image data may be combined with 3D point data to render depth calculations. For example, since walls 302 and 304 can be detected, their extent in 3D space may be projected for some distance. While this distance alone is unknown, it can be seen that the wall 102.2 is visible in the 2D image of FIG. 7A. By overlaying 3D data with extended walls with the filtered 2D data, the rear wall 102.2 can be placed in the path of the two walls 302 and 304. Having this positional information can allow a selection of one or more z coordinate values along either of the wall 302 and/or 304 projections that first come intersect the wall 102.2. This value can then serve as the depth value of the container.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method of dimensioning a space bound by at least a first wall and a second wall opposite the first wall, the space being three-dimensional and definable via height, width, and depth coordinates, the method comprising:
   obtaining, by an image capture apparatus, a three-dimensional image of at least a portion of the space;
   analyzing, by a processor, the three-dimensional image to determine a first equation defining a first plane corresponding to the first wall and to determine a second equation defining a second plane corresponding to the second wall;
   solving, by the processor, the first equation for a first coordinate value on the first plane;
   solving, by the processor, the second equation for a second coordinate value on the second plane, the first coordinate value and the second coordinate value being one of a width coordinate or a height coordinate; and
   computing a first distance based at least in part on the first coordinate value and the second coordinate value,
   wherein:
      the first equation is expressible as $Ax+By+Cz=D$;
      the second equation is expressible as $Ex+Fy+Gz=H$;
      x corresponds to a width coordinate value, y corresponds to a height coordinate value, and z corresponds to a depth coordinate value; and
      each of A, B, C, D, E, F, G, and H is expressible as a respective real number coefficient.

2. The method of claim 1, wherein the first wall is parallel the second wall.

3. The method of claim 1, wherein analyzing the three-dimensional image includes conducting sample consensus (SAC) segmentation analysis.

4. The method of claim 1, wherein solving the first equation and solving the second equation includes selecting a z value that corresponds to a distance no more than 3 meters from the image capture apparatus along a respective axis.

5. The method of claim 1, wherein computing the first distance includes subtracting the first coordinate value from the second coordinate value.

6. The method of claim 1, wherein the three-dimensional image includes a point cloud.

7. The method of claim 1, further comprising correcting for distortion imparted by the image capture apparatus.

8. The method of claim 1, further comprising
   solving the first equation for a third coordinate value;
   solving the second equation for a fourth coordinate value, the third coordinate value and the fourth coordinate value being the same one of the width coordinate or the height coordinate as the first coordinate value and the second coordinate value;
   computing a second distance between the first wall and the second wall based at least in part on the third coordinate value and the fourth coordinate value; and
   computing a third distance based at least in part on the first distance and the second distance.

9. The method of claim 1, wherein the first distance corresponds to a separation between the first wall and the second wall.

10. The method of claim 1, wherein the space is an interior space of a container having an opening.

11. The method of claim 10, wherein the image capture apparatus is mounted near the opening.

12. A method of dimensioning a height of a space bound by at least a floor, a first upright wall, and a second upright wall, the space being three-dimensional and definable via height, width, and depth coordinates, the method comprising:
   obtaining a three-dimensional image of at least a portion of the space, the three-dimensional image including three-dimensional point data;
   analyzing, by a processor, the three-dimensional image to determine a first equation defining a first plane corresponding to the floor;
   solving, by the processor, the first equation for a first height coordinate value on the first plane;
   determining, by the processor, a second height coordinate value that is selected from within a first plurality of greatest height coordinate values associated with the first upright wall;
   determining, by the processor, a third height coordinate value that is selected from within a second plurality of greatest height coordinate values associated with the second upright wall; and
   computing a first distance based at least in part on the first height coordinate value and a lower one of the second height coordinate value and the third height coordinate value,
   wherein the first equation is expressible as $Ax+By+Cz=D$,
   wherein x corresponds to a width coordinate value, y corresponds to a height coordinate value, and z corresponds to a depth coordinate value, and
   wherein each of A, B, C, and D is expressible as a respective real number coefficient.

13. The method of claim 12, wherein
   solving the first equation includes solving for y by selecting an x value and a z value that corresponds to respective distances no more than 3 meters from an image capture device used to obtain the three-dimensional image along respective axis.

14. The method of claim 12, wherein the first wall is opposite and parallel to the second wall.

15. The method of claim 12, wherein the space is further bounded by a ceiling, and the three-dimensional point data omits data associated with the ceiling.

16. The method of claim 12, further comprising applying a noise filter to the three-dimensional image prior to determining the second height coordinate value and determining the third height coordinate value.

17. The method of claim 12, wherein analyzing the three-dimensional image includes conducting sample consensus (SAC) segmentation analysis.

\* \* \* \* \*